Oct. 11, 1960 H. T. FRIIS 2,956,276

DIVERSITY SYSTEM

Filed Sept. 16, 1957 5 Sheets-Sheet 1

INVENTOR
H. T. FRIIS
BY Roy M. Porter, Jr.
ATTORNEY

Oct. 11, 1960 H. T. FRIIS 2,956,276

DIVERSITY SYSTEM

Filed Sept. 16, 1957 5 Sheets-Sheet 2

INVENTOR
H. T. FRIIS
BY Roy M. Porter Jr.
ATTORNEY

Oct. 11, 1960 H. T. FRIIS 2,956,276

DIVERSITY SYSTEM

Filed Sept. 16, 1957 5 Sheets-Sheet 3

INVENTOR
H. T. FRIIS
BY Roy M. Porter Jr.
ATTORNEY

INVENTOR
H. T. FRIIS
BY Roy M. Porter, Jr.
ATTORNEY

INVENTOR
H. T. FRIIS
BY Roy M. Porter, Jr.
ATTORNEY

United States Patent Office 2,956,276

Patented Oct. 11, 1960

2,956,276

DIVERSITY SYSTEM

Harald T. Friis, Rumson, N.J., assignor to Bell Telephone Laboratories, Incorporated, New York, N.Y., a corporation of New York Filed Sept. 16, 1957, Ser. No. 684,026

14 Claims. (Cl. 343—100)

This invention relates to electromagnetic wave transmission systems and, more particularly, to high frequency transmission systems employing diversity reception.

It was not until comparatively recently that workers in the communications field positively established that propagation of wave signals could be accomplished reliably over distances greater than the line of sight. These "over-the-horizon" or "scatter propagation" systems are now widely accepted. The October 1955 Proceedings of the I.R.E., vol. 43, No. 10, is devoted in its entirety to a complete survey of the principles of scatter propagation.

One recurring problem in the utilization of over-the-horizon propagation systems is fading signal strength at the receiving station. This fading is caused predominantly by variations in the characteristics of the portion of the atmosphere toward which the transmitted signals are directed and from which they are reflected or scattered in a forward direction. Diversity reception has been employed in the communications field to eliminate substantially the undesirable results caused by the fading phenomenon. There are several well-known types of diversity reception. They may be classified as (*a*) frequency diversity, in which the information bearing signals are transmitted and received at two different wavelengths, (*b*) time diversity, in which identical signals are transmitted at two spaced time intervals, (*c*) polarization diversity, in which the transmitted signals are orthogonally polarized, and (*d*) space diversity, in which the receiving station has a plurality of collecting antennas which are physically spaced apart by at least 25 wavelengths of the carrier frequency of the energy being received.

Of the types of diversity above mentioned, each of the first three, while theoretically feasible, has important drawbacks which prevent its wide application as a solution to the fading problem. The majority of scatter propagation diversity systems employ the latter type; namely, space diversity. In the application of space diversity principles to long distance wave transmission, it is necessary to employ at least two antennas physically separated in space. Such an arrangement is costly since duplication of substantially identical antennas is necessary.

It is therefore an object of this invention to receive diversity signals in a new and improved manner.

It is a further and more specific object of this invention to receive diversity signals in a single antenna multiple lobe scatter propagation transmission system.

It is a still further object of this invention to transmit an essentially equiphase beam from and to receive multiple essentially uncorrelated wave energy beams at a single communication station operating under the principles of multiple lobe diversity.

In accordance with the principles of the present invention, there is yet another possible type of diversity reception heretofore unappreciated in the art. For purposes of identification and classification, this new and useful embodiment of the diversity concept is designated "single antenna multiple-lobe diversity." When the term multiple-lobe diversity is used in this specification, it will be understood to refer to a system operable in conjunction with a single antenna or antenna assembly at the receiving terminal. The appropriateness of this designation will become apparent from the system descriptions which follow.

In scatter propagation reception there are two principal types of fading; slow fading and fast fading. Slow fading is descriptive of variation in signal level at the receiver over a period of hours or longer and seems to be associated with macroscopic changes in the average refractive quality of the atmosphere. Fast fading of signal level at the receiver is due to multipath transmission in the atmosphere caused by small variations in the scattering or reflecting portions of the atmosphere hereinabove mentioned. In general, a diversity system has its greatest advantage in overcoming the fast fading of wave energy signals.

It is known in the art that if the physical size of a receiving antenna in a free space, or point-to-point transmission system is doubled, the antenna gain is increased six decibels. It has been observed, however, that if the physical size of the receiving antenna in an over-the-horizon propagation system is doubled, the antenna gain increases an amount less than six decibels. This observed phenomenon may be explained on the basis that the phase front of the wave energy incident on the antenna is not uniform, and, as a result of the cancellation effect of the variously phased components, the resultant received wave energy is of lesser magnitude than predicted.

In accordance with the invention, it has been observed that the fast fading characteristics of scattered wave energy incident upon different surface areas of a relatively large and highly directive reflecting antenna are substantially uncorrelated. That is, while the received signal strength may be at its minimum value at one point on the antenna surface, it may be at its maximum value at the same instant at a different location on the face of the same antenna or reflector.

It is known that energy reflected for transmission from a large parabolic antenna illuminates a solid angle of the atmosphere. This solid angle is commonly designated an antenna lobe. If a single emitting or radiating means is illuminating the reflector, a single lobe is created. However, a multiplicity of such means concurrently illuminating the reflector will produce a multiplicity of antenna lobes. The relationship among the lobes is determined by the location of the emitting means with respect to the focal point of the reflector in a manner to be described hereinafter. Thus far in this specification, the concept of antenna lobes has been used solely with respect to transmission of wave energy. The lobe concept is equally well applicable to an explanation of the reception of wave energy. Each lobe may be thought of as being associated with a particular energy emitting means situate facing the reflector. This emitting means may function simultaneously as a wave energy absorbing or collecting means. Thus wave energy in the atmosphere which is intercepted by a given lobe and which is propagating in a direction parallel to the axis of symmetry of the lobe will be incident upon the reflector face and will be directed to the collecting means associated with that particular lobe. It may be appreciated that if the wave energy incident on the face of a highly directive reflector has been found to be uncorrelated, it is likely that the wave energy directed to each of the individual collecting means will likewise be uncorrelated. When these bifunctional means are constructed properly, a relatively wide resultant equiphase transmission beam may be produced at a transmitting station but as a result of the high directivity of the large antenna each absorbing or collecting means, by virtue of its intimate association with a particular wave energy lobe, will be "looking at" a different section of the troposphere and thus will be receiving a wave signal whose fast fading characteristics differ from the others in a random manner.

The above and other objects and features of the present invention, its nature, and its various advantages, will appear more fully upon consideration of the accompanying drawings and the detailed descriptions thereof which follow.

Figure 4:
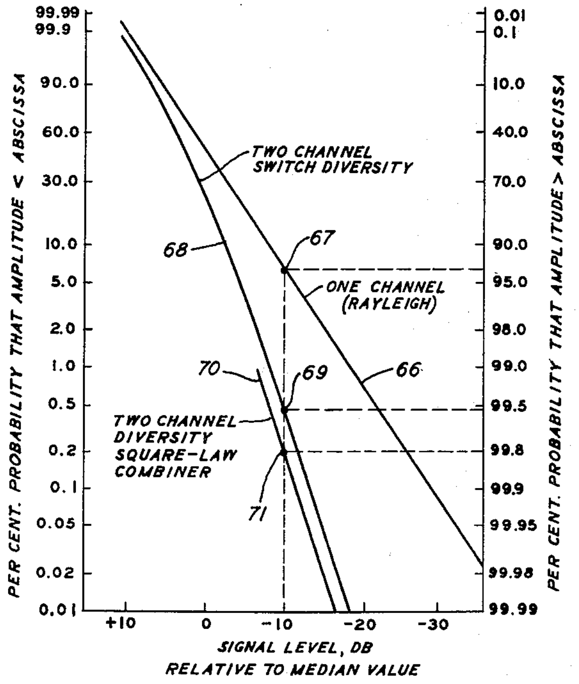
Figure 5:
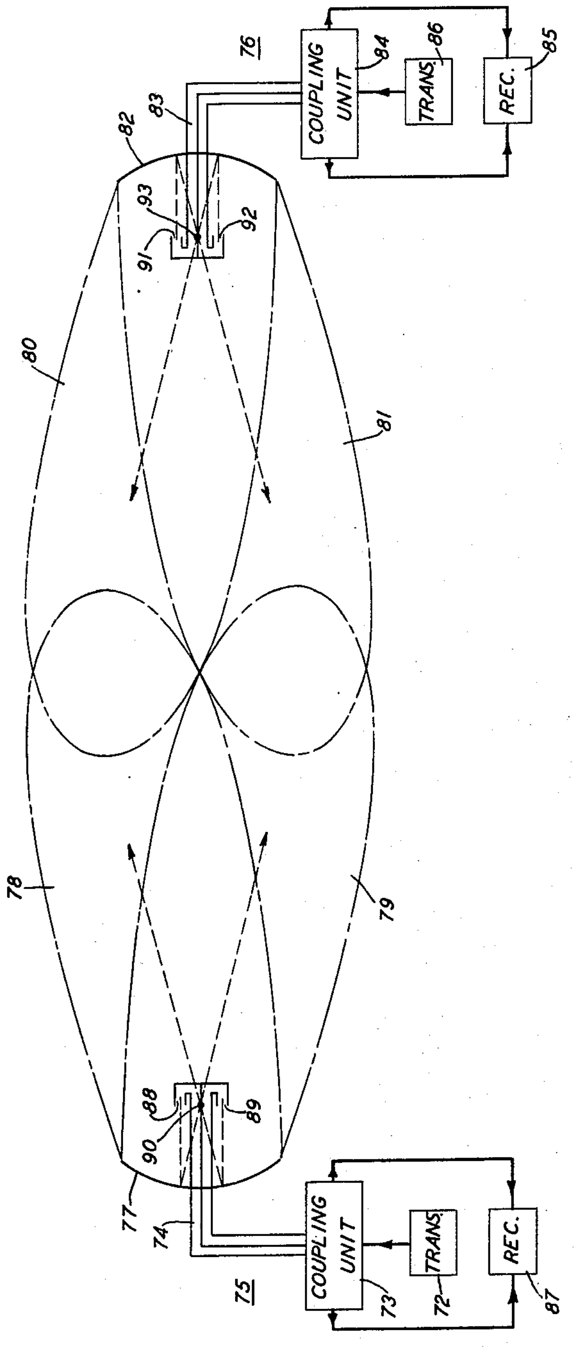
Figures 6, 7:
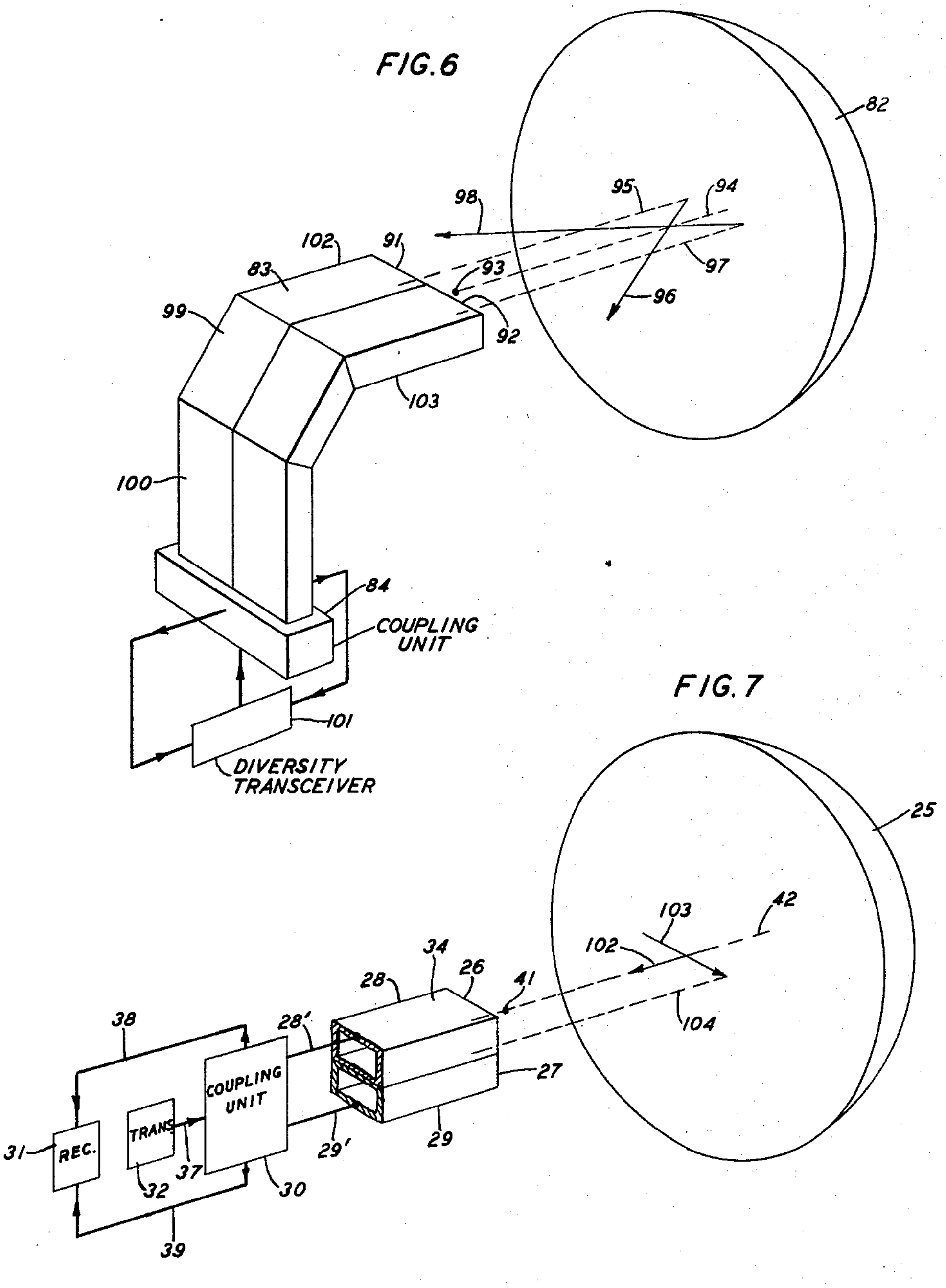

Fig. 4, given by way of explanation, is a graph illustrating the theoretical diversity advantage afforded by the invention;

Figs. 5 and 6 are views of a second principal embodiment of the invention; and

Figure 2:
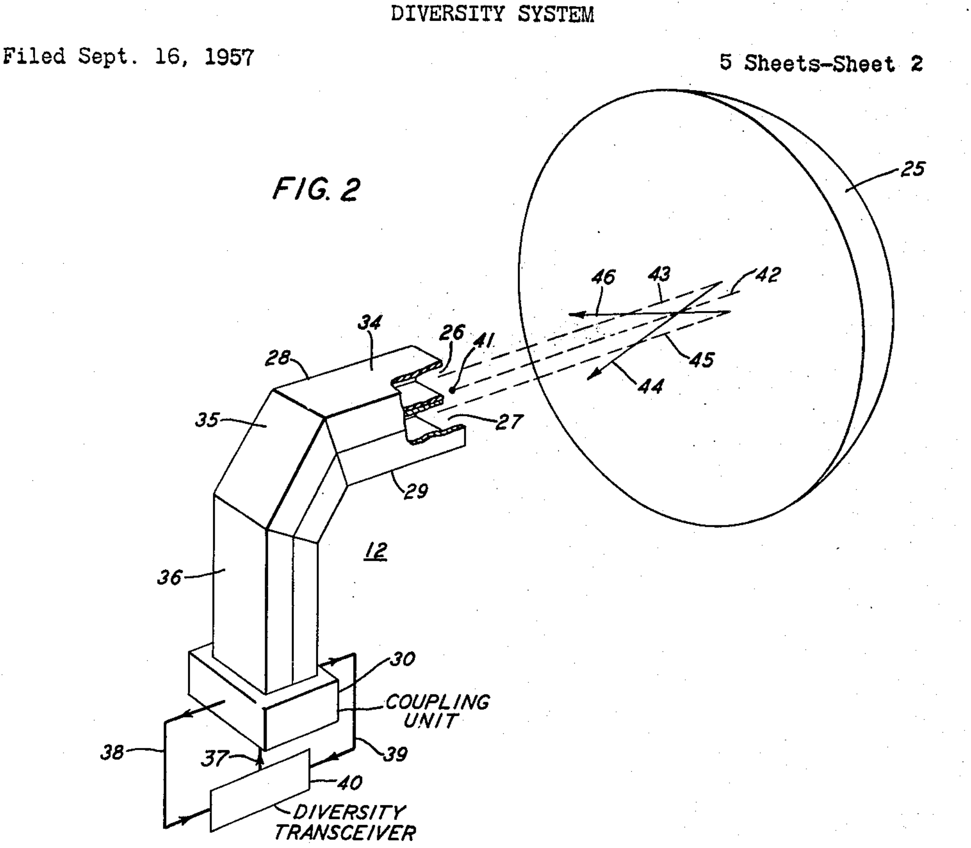
Fig. 2 is a perspective view, partly broken away, of one transmission terminal in a scatter propagation system illustrating the multiple lobe concept.

Fig. 7 is a modification of the embodiment of the invention shown in Fig. 2.

Figure 1:
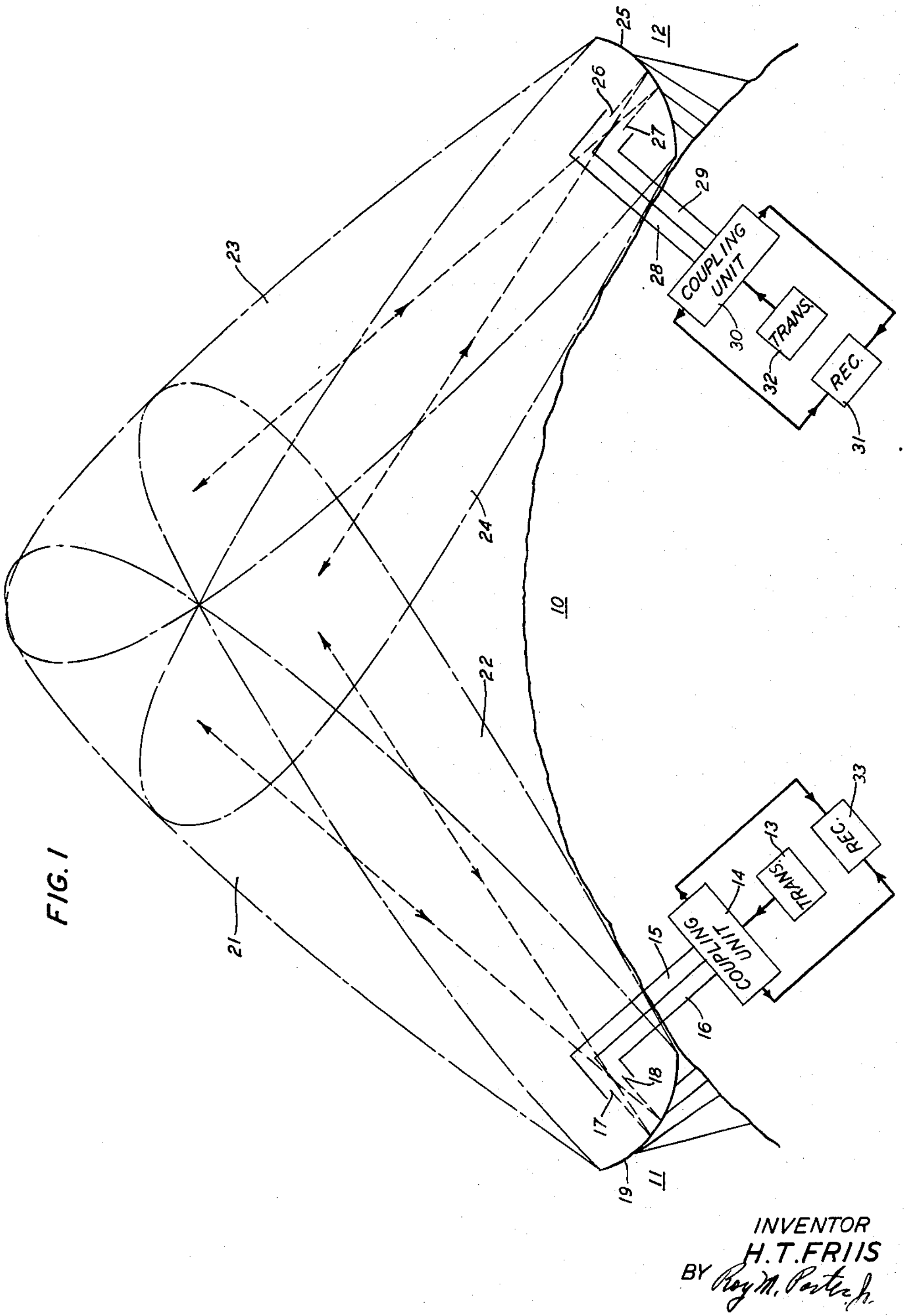
Fig. 1 is a view, partly in vertical cross-section and partly in block form, of a principal embodiment of a single antenna multiple lobe diversity system.

Referring more particularly to Fig. 1, there is shown by way of example, in exaggerated form, a two-way tropospheric scatter propagation system employing multiple lobe diversity reception. Situated on the surface of the earth 10 and separated by a distance greater than the line of sight are the two terminal stations 11, 12. Stations 11, 12 may simultaneously transmit and receive wave energy or they may operate as a one-way system, depending on the particular requirements of the communication system of which they are a part. For purposes of initial explanation, one-way transmission from station 11 to station 12 will be assumed. In the operation of the system, energy from transmitter 13 is propagated through coupler 14 into parallel waveguides 15, 16. Coupler 14 provides means for directing wave energy traveling in one direction from transmitter 13 into parallel wave paths 15, 16 in a manner precluding the introduction of unequal amounts of phase shift into the separate paths and at the same time to direct wave energy traveling in wave paths 15, 16 in the opposite direction into separate wave paths distinct from one another and connected to diversity receiver 33. In this manner, the individual characteristics of the energy in each of the incoming channels is preserved. Waveguides 15, 16 terminate in apertures 17, 18 which may be preceded by flared feed horns, by waveguide sections of constant cross section, or by tapered waveguide sections. Emitted wave energy from apertures 17, 18 impinges upon reflector 19 whence it is directed outward and upward into the atmosphere in diverging solid angles or lobes 21, 22. The relation between the orientation of lobes 21, 22 in the atmosphere and the location of apertures 17, 18 with respect to reflector 19 will become more apparent hereinafter. Energy propagating toward the troposphere is reflected or scattered in a forward direction. The exact physical mechanism by which this forward reflection takes place is not at present fully understood. H. G. Booker and W. E. Gordon in their article "A Theory of Radio Scattering in the Troposphere" appearing in Proceedings of the I.R.E., vol. 38, April 1950, p. 401, and F. Villars and V. F. Weisskopf in their paper "Scattering of EM Wave by Turbulent Atmospheric Fluctuations" in the Physical Review, vol. 94, No. 2, April 1954, p. 232, develop scatter theories based on the turbulence of the atmosphere. The present inventor, in collaboration with A. B. Crawford and D. C. Hogg, has proposed a theory in which uncorrelated reflections from stratifications in the troposphere are assumed to be responsible for the power propagated beyond the horizon. The portion of the transmitted energy comprising lobes 21, 22 which is reflected toward station 12 is extremely small. Losses of from 60 to 80 decibels greater than for free space transmission are common. However, this loss is significantly lower than that predicted from earth diffraction effects alone. The energy scattered by the troposphere and traveling toward station 12 may be thought of as associated with antenna lobes 23, 24. Energy incident upon reflector 25 is reflected therefrom into apertures 26, 27. As will be more fully understood from further explanation hereinafter each of receiving lobes 23, 24 is intimately related to apertures 27, 26, respectively. From Fig. 1, it may be seen that the two lobes 23, 24 are divergent in space and thus, in effect, are monitoring or "looking at" portions of the atmosphere of different refractive characteristics. It has been established that the fading characteristics of the wave energy contained in lobes 23, 24 are uncorrelated. In order to utilize this phenomenon of non-correlation to advantage, the received energy is guided in separate wave paths 28, 29 into coupler 30, which functions in a manner similar to coupler 14 described above, and thence by separate channels into diversity receiver 31.

Diversity receiver 31 is an electronic monitoring system which operates upon the energy received via wave paths 28, 29 and provides without amplification a resultant output signal with an average amplitude distribution higher than either of the Rayleigh distributed input signals. Receiver 31 may be of the receiver switching type, the signal combination type, or of any other diversity receiver types known in the art. The basic techniques to be followed in the design of receiver 31 may be found in an article entitled "Diversity Reception in UHF Long-Range Communications" by C. L. Mack appearing at p. 1281 in the above-mentioned October 1955 Proceedings of the I.R.E.

For transmission in the opposite direction, that is, transmitting from station 12 and receiving at station 11, energy from transmitter 32 passes through coupler 30 into waveguides 28, 29 and thence from apertures 26, 27 onto reflector 25 from which it is reflected into the troposphere in lobes 23, 24 and is scattered in a forward direction. A portion of the energy in lobes 23, 24 is reflected by the troposphere and directed downward into lobes 21, 22 associated with apertures 17, 18 facing reflector 19. The uncorrelated received energy propagates in separate channels 15, 16 into coupler 14 and thence is coupled into dual paths leading to diversity receiver 33.

As stated hereinbefore, prior to the instant disclosure, advantages of diversity reception were thought to be best attainable in scatter propagation systems through the use of two spaced antennas. It was suggested that they be situated on a line perpendicular to the direction of propagation and be separated by a minimum of 25 wavelengths of the energy being received. Distances considerably greater than 25 wavelengths were recommended for best results. As a recent example of such teaching, see p. 1278 of vol. 43, Proceedings of the I.R.E. mentioned above. However, by a realization of the fact that the fast fading characteristics of tropospherically scattered wave energy received at different locations on the face of a single highly directive energy reflector are uncorrelated, the present inventor has appreciated the fact that there is no necessity for duplication of the antenna structures. In accordance with the invention it becomes necessary only to provide multiple wave energy emitting and collecting means in the vicinity of the focal point of a single reflector.

Fig. 2 is a more detailed view of an example of an antenna station embodying the principles of multiple lobe diversity. For purposes of discussion, it may be assumed that Fig. 2 represents station 12 of Fig. 1 with corresponding reference numerals for corresponding component parts carried over. In practice the illustrated reflector would be considerably larger with respect to the waveguide feed device than is indicated in the figure. In Fig. 2 is shown feed device 34 which is composed of conductive waveguides 28, 29 terminating in apertures 26, 27. Waveguides 28, 29 may be square or round if dual wave energy polarizations are to be used or they may be of the dominant mode rectangular type having a wide internal dimension greater than one-half wavelength and less than one wavelength of the energy to be conducted thereby and a narrow dimension substantially one-half of the wide dimension. As illustrated in Fig. 2, feed device 34 may be preceded by a 90-degree bend section 35 which in turn is connected through straight guide section 36 to coupling device 30 which may be a frequency selective device, a polarization selective device, a ferrite circulator, or the particular type disclosed in the copending application of A. B. Crawford, Serial No. 684,146, filed September 16, 1957.

As stated hereinabove, coupler 30 provides means for directing wave energy from a transmitter into two identical paths for transmission purposes and for directing uncorrelated wave energy received at the terminal station and arriving in dual channels 28, 29 from feed device 34 into separate wave guiding paths connected to a diversity receiver. Connected to coupling device 30 through transmitting path 37 and receiving paths 38, 39 is diversity transceiver 40. Diversity transceiver 40 is not limited to the type utilizing the same tubes for transmission and reception and may comprise a transmitter and a diversity receiver operative independently or it may comprise a single simultaneously functioning unit.

Facing apertures 26, 27 is parabolic reflector 25. The reflector is illustrated in Fig. 2 as a concave paraboloidal mirror but it may be of any geometrical shape characterized by high directivity and adapted to long distance wave transmission systems. Reflector 25 may be a cylindrical parabolic reflector or a sectorial parabolic reflector, for example. The focal point of reflector 25 is designated in Fig. 2 as point 41. In accordance with one embodiment of the invention, apertures 26, 27 of feed device 34 are disposed in a symmetrical fashion about focal point 41. As is well known, energy propagating from a point source located at focal point 41 would be reflected from reflector 25 as a major lobe centered about longitudinal axis 42. Since the apertures 26, 27 are displaced from focal point 41, each aperture may be thought of as a separate point source of wave energy. Thus, emitted energy from upper aperture 26 propagates along longitudinal axis 43 toward reflector 25 and is reflected therefrom at an acute angle to longitudinal axis 42 in a major lobe whose maximum intensity is downwardly displaced from axis 42 and is represented by vector 44. Similarly, emitted energy from lower aperture 27 propagates along longitudinal axis 45 toward reflector 25 and is reflected therefrom at an acute angle to longitudinal axis 42 in a major lobe whose maximum intensity is upwardly displaced from axis 42 and is represented by vector 46.

From the preceding discussion it is seen that apertures 26, 27 are intimately related to the dual antenna lobes, represented by vectors 44, 46 respectively, of reflector 25 for the operation of station 12 as a transmitter. This intimacy remains intact for the operation of station 12 as a receiver. That is, wave energy propagating toward reflector 25 substantially parallel but in directional opposition to vector 44 will, upon incidence upon reflector 25, be reflected at an acute angle thereto and directed along longitudinal axis 43 toward and into aperture 26. In a similar manner, scattered wave energy impinging upon reflector 25 in a direction substantially parallel but in directional opposition to vector 46 will, upon its incidence upon reflector 25, be reflected thereby and be directed along longitudinal axis 45 into aperture 27.

Thus it is clear that lobes 23, 24 of terminal 12 of Fig. 1 may be thought of, not only as the volumetric extent of illumination of a distinct portion of the atmosphere for transmission purposes but also as the volumetric extent of the portion of the atmosphere monitored or "looked at" by apertures 27, 26, respectively, of feed device 34 of Fig. 2 for reception purposes. From experimental observation as well as by theoretical derivation, it has been established that the energy reflected from distinct portions of the troposphere by scatter propagation methods is characterized by essentially uncorrelated fast fading characteristics. Since this is the case, and since the receiving lobes related to apertures 26, 27 are distinctly divergent in the troposphere, the energy received by these apertures and separated in channels 28, 29 of feed device 34 will likewise be uncorrelated and a signal strength advantage may be gained by use of diversity techniques.

Figure 3A:
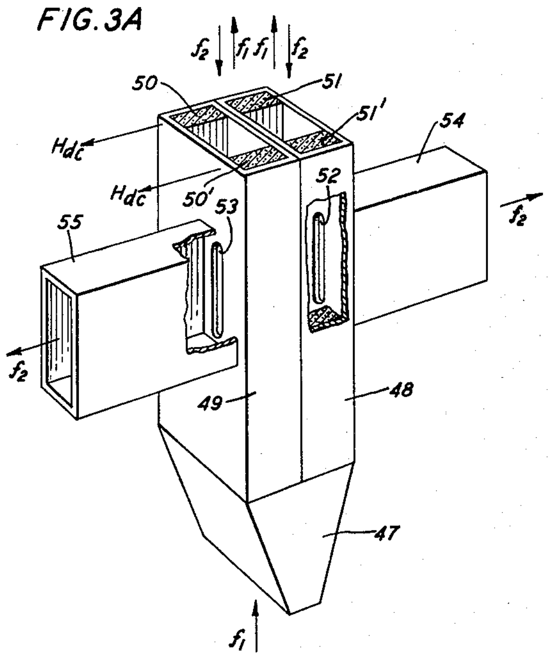
Fig. 3A is a perspective view, partly broken away, of a coupling unit operable with a single antenna multiple lobe diversity system.

Fig. 3A is a perspective view of a possible structure utilizable as the coupling devices 14 and 30 in Fig. 1. The particular device illustrated comprises two three-terminal ferrite circulators of the field displacement type arranged in parallel fashion. This coupling unit is directionally selective in operation as will appear more fully in the descriptions hereinafter. A complete disclosure and description of field displacement circulator structures may be found in the copending application of S. E. Miller, Serial No. 371,437, filed July 31, 1953, now U.S. Patent No. 2,849,683, issued Aug. 26, 1958.

The illustrated coupler comprises a transducer 47 connected at one end to sections 48, 49 of rectangular waveguide having gyromagnetic elements 50, 50′, 51, 51′ located therein near to the narrow walls thereof. These elements are biased by a transverse magnetic field indicated by vectors $H_{dc}$. An elongated aperture 53 is located in the outer wide wall of waveguide 49 and is displaced from the center line thereof. In similar location in the outer wide wall of waveguide 48 is elongated aperture 52. Centered about apertures 52, 53 with their transverse ends abutting and connected to the wide walls containing said apertures and making T-type junctions with waveguides 48, 49 are third and fourth rectangular waveguides 54, 55 respectively. The wide dimensions of guides 54, 55 are parallel to the axis of guides 48, 49. By virtue of the different effect of the polarized gyromagnetic material on wave energy traveling in opposite directions through guides 48, 49, the complete explanation of which appears in the above-mentioned copending application of S. E. Miller, wave energy propagating in one direction through guides 48, 49 will pass apertures 52, 53 unaffected thereby but wave energy propagating in the opposite direction will be magnetically coupled into guides 54, 55.

In the operation of the device of Fig. 3A as coupler 14 or 30 in Fig. 1, wave energy from the transmitter enters transducer 47 and is equally divided into two portions traveling upwardly in waveguides 48, 49. In accordance with the principles of the above-mentioned copending application of S. E. Miller this energy passes through guides 48, 49 unaffected by apertures 52, 53, into section 36 of Fig. 2 and thence onto the antenna reflector in an equiphase front energy beam.

Wave energy incoming from the atmosphere, having passed through feed device 34, bend 35, and section 36 of Fig. 2 enters waveguides 48, 49 of Fig. 3A. By virtue of the effect of the polarized gyromagnetic material, this energy is coupled by apertures 52, 53 into separate wave paths 54, 55 which are connected to a diversity receiver. Thus, the device of Fig. 3A is direction sensitive and provides the requisite coupling function of devices 14, 30 of Fig. 1. The circulator action of Fig. 3A could be equally well provided by Faraday rotation devices such as those described in United States Patent No. 2,644,930 to C. H. Luhrs et al., or by non-reciprocal directional couplers described in the copending application of W. J. Crowe, Serial No. 590,555, filed June 11, 1956, now U.S. Patent No. 2,894,216, issued July 7, 1959.

In the embodiment of Fig. 3A just described, the problem of interference between the transmitted and received signals, commonly designated "cross-talk," may arise. One method by which this problem may be substantially solved is by the use of a different carrier frequency for the transmitted wave than that used for the received wave. The allowable difference between these two frequencies would be controlled in part by the cross sectional dimensions of the waveguides employed. The physical principle of operation of the device of Fig. 3A remains the same for the separated carrier frequency case. As illustrated by the arrows extending in the direction of energy travel at the open apertures of the coupler of Fig. 3A, energy at frequency $f_1$ enters transducer 47 and passes through and out of waveguides 48, 49 as indicated by upwardly directed arrows $f_1$. The energy received from a distant transmitting station, having a carrier frequency $f_2$, different from $f_1$, indicated by downwardly directed arrows $f_2$ enters waveguides 48, 49 and is coupled by apertures 52, 53 into waveguides 54, 55 from which, as indicated again by arrows $f_2$, it propagates to the diversity receiver.

Figure 3B:
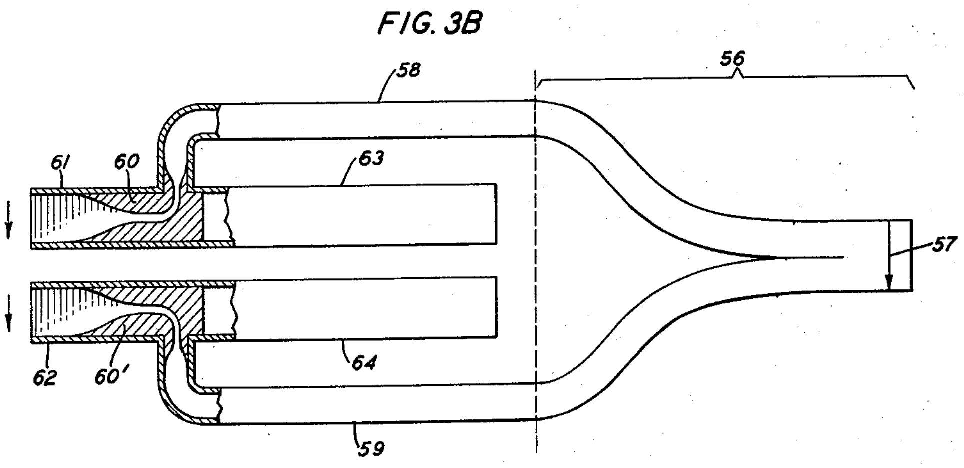
Fig. 3B is a schematic view of a second type coupling unit which may be used with the invention.

The problem of cross-talk may be still further reduced by the utilization of the polarization selective device illustrated in Fig. 3B. In the operation of the coupler of Fig. 3B, which provides the necessary function of devices 14, 30 of Fig. 1, either the same carrier frequency may be used for the transmitted and received energy, or different carrier frequencies, as discussed above in conjunction with Fig. 3A may be employed. The structure which provides the polarization selectivity is the fin line coupler disclosed and fully described in the copending application of the present inventor and S. D. Robertson, Serial No. 485,672, filed February 2, 1955, now U.S. Patent No. 2,921,272, issued Jan. 12, 1960. In the operation of Fig. 3B, energy from the transmitter enters transducer 56 polarized in the plane of the paper as illustrated by vector 57 and is divided into equal portions in dual rectangular waveguides 58, 59. The energy in each guide passes along fins 60, 60' into square or round waveguides 61, 62, still polarized in the plane of the paper. As above in the device of Fig. 3A, this energy then passes into section 36 of Fig. 2 and is eventually emitted into the atmosphere. Incoming wave energy, received from a distant transmitter and polarized in a direction perpendicular to the plane of the paper enters wave paths 61, 62 and propagates unaffected by fins 60, 60' into dual waveguides 63, 64 which may be of round, square, or rectangular cross-section and thence to a diversity receiver. At the distant transmitting station, the device of Fig. 3B may be modified to provide the necessary geometry either by removing transducer 56 and connecting the proper junction to waveguides 63, 64 or by rotating the plane of the fins 90 degrees and replacing transducer 56 with the requisite junction.

Fig. 4 is given by way of illustration to demonstrate the reduction in fast fading characteristics possible through the use of diversity reception techniques. Curve 66 describes the usual Rayleigh distributed signal received by a single channel tropospheric scatter propagation circuit. From curve 66 it may be seen that for 94 percent of the time, the signal will be stronger than 10 decibels below its median value. This is illustrated as point 67 on the graph. Performance may be improved through the introduction of diversity principles into the receiver. Curve 68 represents the distribution of the signal produced by a two-channel receiver of the switch diversity type. Switch diversity systems utilize the stronger of the incoming signals at any given instant while discarding entirely the weaker. As illustrated by point 69, in two-channel switch diversity the received signal will be stronger than 10 decibels below its median value for 99.6 percent of the time. By utilizing a two-channel combinational type diversity—one in which neither signal is totally discarded—the quality of performance may be increased still more. Curve 70 depicts the theoretical curve for such a combinational type receiver. The general principle of a square law combinational type receiver is presented in a note "Ratio Squarer" by Mr. L. R. Kahn, appearing in Proceedings of the I.R.E., volume 42, November 1954, at page 1704. As depicted by point 71, the received signal with such a system will be stronger than 10 decibels below its median value for more than 99.8 percent of the time.

The principal embodiment of the invention illustrated in Figs. 1–3 and discussed above has been described with a vertical displacement of the dual apertures of the feed device in a symmetrical fashion about the focal point of the reflector.

This vertical displacement of the apertures of the feed device is more particularly suited for certain applications of over-the-horizon wave propagation. However, it has been found that a horizontal displacement of these apertures is more attractive for other applications. For example, with a 60-foot parabolic antenna, the vertical displacement has been found to be more particularly suited for energy reception at 460 megacycles while a horizontal displacement is more attractive at higher frequencies, at 4000 megacycles. The principles of operation for the horizontally and vertically displaced feed apertures are essentially the same. That is, dual received energy beams are uncorrelated with respect to their fast fading characteristics and thus a diversity advantage may be realized.

Fig. 5 is a top view of a multiple lobe diversity system utilizing horizontally displaced antenna lobes. Transmission terminal 75 operates as follows: energy from transmitter 72 passes through coupling device 73, into and through feed device 74, and thence out of apertures 88, 89 which are horizontally displaced about focal point 90 of reflector 77 into the atmosphere in lobes 78, 79. Scattered energy directed along the axes of symmetry of lobes 80, 81, associated with parabolic reflector 82 of terminal 76, impinges upon the reflector and is directed into apertures 91, 92 of feed device 83 which is symmetrically displaced in a horizontal plane about the focal point 93 of reflector 82. This energy travels via coupling device 84 into separate channels and ultimately to diversity receiver 85. For reverse transmission the operation of the system is analogous to that described above, energy being generated by transmitter 86 of terminal 76 and received at diversity receiver 87 of terminal 75.

Fig. 6 is a perspective view of one terminal of the horizontally displaced aperture embodiment discussed in connection with Fig. 5. It may be assumed for purposes of discussion that the structure of Fig. 6 is terminal 76 of Fig. 5 with corresponding reference numerals for corresponding component parts carried over. The method of operation of the device of Fig. 6 as regards 90-degree bend 99, wave guide section 100, coupling device 84, and diversity transceiver 101 is identical to that discussed above in conjunction with Fig. 2.

Feed device 83 is composed of conductive wave guides 102, 103 which may be square, round, or rectangular in cross-section as discussed hereinbefore, terminating in apertures 91, 92 which face and are horizontally displaced about the focal point 93 of reflector 82. A point source of energy at point 93 incident upon reflector 82 will be reflected in a major lobe which is symmetrical with optical axis 94. However, since apertures 91, 92 are displaced from the focal point 93, each aperture may be thought of as a separate point source of wave energy. Thus emitted energy from left aperture 91 propagates along longitudinal axis 95 toward reflector 82 and is reflected therefrom at an acute angle to longitudinal axis 95 in a major lobe whose maximum intensity is displaced to the right of axis 94 and is represented by vector 96. Similarly, energy emitted from right aperture 92 propagates along longitudinal axis 97 toward reflector 82 and is reflected therefrom at an acute angle to longitudinal axis 97 in a major lobe whose maximum intensity is displaced to the left of axis 94 and is represented by vector 98. For reception of energy from the atmosphere these horizontally displaced lobes, represented by vectors 96 and 98, monitor or "look at" portions of the atmosphere of different refractive quality, thus presenting incoming wave energy signals to apertures 91, 92 which have uncorrelated fading characteristics and which may be utilized to realize diversity advantage.

For the vertically displaced feed aperture case of Figs. 1 and 2, energy emitted from the lower aperture will be directed into the atmosphere at a considerably greater angle with respect to the surface of the earth than will be the energy emitted from the upper aperture. It may be seen from Fig. 1 that the common atmospheric volume embraced by the upper lobes associated with the transmitting and receiving terminal stations is located at a higher elevation than the common volume associated with the lower lobes. It is known that the amount of power scattered or directed downward in a forward direction by the mechanics of scatter propagation depends to a significant degree upon the density or rarefaction of the atmosphere. It is evident that less power will be received by the lower collecting apertures than by the upper collecting apertures of a vertical diversity system.

Fig. 7 is a modification of the transmission terminal shown in Fig. 2 as incorporated into Fig. 1 with corresponding reference numerals for corresponding component parts carried over. The modification consists essentially of placing one energy emitting and collecting aperture at the focal point of a parabolic reflector and transmitting energy from this one aperture alone, rather than from all apertures. Although energy is transmitted from the aperture at the focal point only, energy is received as in all the embodiments disclosed above, at all apertures. In this manner, the transmitted energy is concentrated in a narrower beam and is reflected from a portion of the troposphere which is of greater average density and higher average index of refraction than is realizable with multiple vertically displaced emitting apertures. At the same time, the multicplicity of uncorrelated received energy signals is retained or for diversity advantage purposes. A higher received power level than that associated with the symmtrically disposed, dual feed aperture case is thus attainable.

In the structure of Fig. 7, feed device 34 comprises conductive wave guides 28, 29 which terminate respectively in apertures 26, 27. Apertures 26, 27 face parabolic reflector 25 which has a focus indicated by point 41. The feed device is oriented with respect to the reflector 25 such that the center of aperture 26 is located at focal point 41 and the center of aperture 27 is displaced therefrom. In the operation of the device of Fig. 7 as a multiple lobe diversity terminal station, wave energy from transmitter 32 propagates along wave path 37 and is coupled by coupler 30 into transmission path 28. This energy is thus propagated only in wave guide 28 and is emitted only from aperture 26. The energy emitted at aperture 26 may be thought of as originating at a point source of wave energy at focal point 41 and, therefore travels toward reflector 25 along longitudinal axis 42 and is reflected therefrom in a major lobe centered about longitudinal axis 42 as indicated by vector 102. No energy is emitted by aperture 27. For reception purposes, energy in the atmosphere propagating parallel but in directional opposition to vector 102 will impinge upon the surface of reflector 25, be reflected along axis 42, and be collected by aperture 26 of wave guide 28. Likewise, energy propagating parallel to vector 103 will be reflected along axis 104 and be collected by aperture 27 of wave guide 29. The uncorrelated energy thus collected at apertures 26, 27 will pass via transmission paths 28', 29' and will be coupled by coupler 30 into separate wave paths 38, 39 and thus will pass to diversity receiver 31.

A scatter propagation system employing vertical multiple lobe diversity reception and functioning in the manner of the device of Fig. 7 may be approximated by utilizing the symmetrically spaced apertures of Fig. 2. In order that similar results be obtained with the structure of Fig. 2, energy would be transmitted from upper aperture 26 alone and the entire antenna system, comprising reflector 25 and feed device 34 would be tilted. Reception of wave energy would, of course, be maintained at all apertures to retain the diversity advantage.

A major prerequisite for the reception of multiple uncorrelated energy beams is a sharply directive antenna. Sharpness of directivity varies in direct proportion to antenna diameter. Thus, a large antenna diameter is necessary to the operability of the invention. Experiments have shown that a parabolic antenna having a diameter of 60 feet is well suited to multiple lobe over-the-horizon diversity propagation at 4000 megacycles.

It should be noted that the reflecting surface and its associated terminal apertures of the feed device may be replaced by two or more highly directive microwave horns arranged in close proximity and functioning as a transmitting antenna assembly and/or a receiving antenna assembly in accordance with the principles of multiple lobe diversity techniques.

It should be further noted that the invention is not limited to the use of two wave energy emitting and collecting apertures facing a wave energy reflector. Any number greater than two may be utilized. As the number of apertures is increased, the realizable diversity advantage will likewise increase.

In all cases, it is understood that the above-described arrangements are illustrative of a small number of the many specific embodiments which can represent applications of the principles of this invention. Numerous and varied other arrangements can readily be devised in accordance with these principles by those skilled in the art without departing from the spirit and scope of the invention.

What is claimed is:

1. A diversity system for beyond-the-horizon propagation of electromagnetic wave energy comprising a first parabolic antenna having a focus, at least two electromagnetic horns spaced about said focus, a transmitter associated with said horns, a diversity receiver having an input from each of said horns, and a second parabolic antenna with similar structural component portions associated therewith located beyond-the-horizon from said first antenna and oriented to receive wave energy signals transmitted by said first antenna.

2. In combination, an electromagnetic microwave energy reflector having a focus, and a multiple lobe diversity transceiver system comprising a transmitter operative at a given carrier frequency, a wave path for guiding energy from said transmitter to at least one of a plurality of wave guide apertures adapted to emit said energy in a given polarization, at least one aperture of which is displaced from said focus, a diversity receiver operative at a given carrier frequency simultaneously upon plural signals, a plurality of electrically separate wave channels connecting said receiver to said apertures, said apertures and said guiding path being adapted to collect said plural signals with a single given polarization, and selective coupling means electrically connecting said transmission and reception paths.

3. In a beyond-the-horizon transmission system for microwaves, an antenna having a focal point, a plurality of energy emitting and collecting means disposed about said focal point, said means adapted to emit an equiphase energy beam and to collect simultaneous multiple uncorrelated beams having the same polarization and carrier frequency and having essentially a Rayleigh phase distribution, and electronic monitoring system connected via a plurality of electrically separate wave channels to said means which system operates upon the energy in said multiple beams and provides without amplification a resultant output signal with an average amplitude distribution higher than a Rayleigh distribution.

4. In combination, a microwave reflector having a focal point, multiple collecting apertures facing said reflector adapted to receive multiple essentially uncorrelated wave energy beams of the same frequency and polarization simultaneously from a single distant transmitting antenna, and a diversity receiver operative with said energy electrically associated therewith via a plurality of electrically separate wave channels, said receiver having a separate input from each of said apertures.

5. The combination according to claim 4 in which at least one of said apertures is displaced from said focal point.

6. The combination according to claim 4 in which one of said apertures is located at said focal point.

7. The combination according to claim 4 in which all of said apertures are displaced from said focal point.

8. A scatter propagation link comprising solely first and second microwave reflectors each having a focus and being spaced away a distance greater than the line of sight, said reflectors being directed toward a common portion of the atmosphere, a plurality of energy emitting and collecting apertures spaced about each of said foci and adapted simultaneously to collect multiple energy beams characterized by identical polarizations and identical carrier frequencies, and a diversity receiver electrically connected to the apertures associated with each of said foci.

9. A high frequency transmission system employing multiple lobe diversity reception including solely first and second antennas spaced apart on the surface of the earth a distance greater than the line of sight and oriented toward a common portion of the atmosphere to permit reception at one antenna of energy transmitted at the other, each of said antennas having a plurality of energy emitting and collecting means associated therewith which are connected respectively to a transmitter and a diversity receiver, each antenna further having a transmitting lobe and a plurality of receiving lobes associated therewith, said antennas being dimensioned to operate at microwave frequencies, said plurality of receiving lobes at each of said antennas being directed toward different volumes of the same common portion of the atmosphere toward which the transmitting lobe of the distant antenna is directed and within which common portion finite downward reflection of the transmitted wave energy occurs.

10. A multiple lobe diversity communication system comprising a first microwave reflector having a focus, first and second wave guiding paths terminating in apertures facing said first reflector, a transmitter associated with said paths, a second microwave reflector spaced away from said first reflector a distance greater than the line of sight and oriented to receive signals from said first reflector, said second reflector having a focus, third and fourth wave guiding paths terminating in apertures facing said second reflector, a diversity receiver associated with said third and fourth paths, said first and second guiding paths and said first reflector being adapted to launch wave energy from said transmitter of a single given polarization and with a single given carrier frequency into the troposphere, said second reflector and said third and fourth guiding paths being adapted to collect a portion of said energy simultaneously from dual lobes having uncorrelated phase characteristics and identical polarizations and to transmit said collected energy via electrically separate wave channels to said diversity receiver.

11. The communication system according to claim 10 in which the apertures associated with any given reflector are located equidistant therefrom and are substantially horizontally displaced on a line passing through the said focus thereof.

12. The communication system according to claim 10 in which the apertures associated with any given reflector are substantially vertically displaced in a plane which is normal to the longitudinal axis of said reflector and which contains the said focus thereof.

13. The communication system according to claim 10 in which one of the apertures associated with any given reflector is located at the said focus thereof.

14. A multiple lobe diversity communication system comprising a first microwave reflector, first and second wave guiding paths terminating in apertures facing said first reflector, a transmitter associated with said paths, a second microwave reflector spaced away from said first reflector a distance greater than the line of sight and oriented to receive signals from said first reflector, third and fourth wave guiding paths terminating in apertures facing said second reflector, a diversity receiver associated with said third and fourth paths, said first and second guiding paths and said first reflector being adapted to launch a first signal from said first transmitter of a single given polarization and of a single given carrier frequency into the troposphere, said second reflector and said third and fourth guiding paths being adapted to collect a portion of said first signal simultaneously from dual lobes having uncorrelated phase characteristics and identical polarizations and to transmit said collected energy via electrically separate wave channels to said second diversity receiver, said third and fourth guiding paths and said second reflector being further adapted to launch a second signal from said second transmitter of a single given polarization and of a single given carrier frequency into the troposphere, said first reflector and said first and second guiding paths being further adapted to collect a portion of said second signal simultaneously from dual lobes having uncorrelated phase characteristics and identical polarizations and to transmit said collected energy via electrically separate wave channels to said first diversity receiver.

References Cited in the file of this patent

UNITED STATES PATENTS

| | | |
|---|---|---|
| 1,667,792 | Martin | May 1, 1928 |
| 2,312,093 | Hammond | Feb. 23, 1943 |
| 2,585,173 | Riblet | Feb. 12, 1952 |
| 2,627,020 | Parnell et al. | Jan. 27, 1953 |
| 2,803,817 | Marasco et al. | Aug. 20, 1957 |

OTHER REFERENCES

Electrical Communication, June 1956, "Simplified Diversity Communication System for Beyond the Horizon Links," pp. 151–164.